(12) United States Patent
Hirose (10) Patent No.: US 9,030,288 B2
(45) Date of Patent: May 12, 2015

(54) SEMICONDUCTOR CERAMIC AND RESISTIVE ELEMENT

(71) Applicant: Murata Manufacturing Co., Ltd., Nagaokakyo-shi, Kyoto-fu (JP)

(72) Inventor: Sakyo Hirose, Nagaokakyo (JP)

(73) Assignee: Murata Manufacturing Co., Ltd., Nagaokakyo-Shi, Kyoto-Fu (JP)

( * ) Notice: Subject to any disclaimer, the term of this patent is extended or adjusted under 35 U.S.C. 154(b) by 184 days.

(21) Appl. No.: 13/867,430

(22) Filed: Apr. 22, 2013

(65) Prior Publication Data

US 2013/0229257 A1 Sep. 5, 2013

Related U.S. Application Data

(63) Continuation of application No. PCT/JP2011/068849, filed on Aug. 22, 2011.

(30) Foreign Application Priority Data

Oct. 27, 2010 (JP) .................................. 2010-240309

(51) Int. Cl.
*H01C 7/00* (2006.01)
*H01C 7/04* (2006.01)
*C04B 35/01* (2006.01)
*H01C 17/065* (2006.01)

(52) U.S. Cl.
CPC ................ *H01C 7/04* (2013.01); *C04B 35/016* (2013.01); *C04B 2235/3215* (2013.01); *C04B 2235/3224* (2013.01); *C04B 2235/3225* (2013.01); *C04B 2235/3263* (2013.01); *C04B 2235/6025* (2013.01); *H01C 7/008* (2013.01); *H01C 7/043* (2013.01); *H01C 17/06533* (2013.01); *C04B 2235/6582* (2013.01); *C04B 2235/6588* (2013.01); *C04B 2235/663* (2013.01)

(58) Field of Classification Search
CPC ............................................ H01C 7/04–7/048
See application file for complete search history.

(56) References Cited

U.S. PATENT DOCUMENTS

| 4,445,109 | A | * | 4/1984 | Naganoma et al. ......... 338/22 R |
| 4,450,426 | A | * | 5/1984 | Miyoshi et al. ................. 338/21 |
| 8,362,869 | B2 | | 1/2013 | Poulain et al. |

(Continued)

FOREIGN PATENT DOCUMENTS

| JP | 2001102204 A | 4/2001 |
| JP | 2004193572 A | 7/2004 |
| WO | WO-2009080319 A1 | 7/2009 |

(Continued)

OTHER PUBLICATIONS

International Search Report and Written Opinion, issued in PCT/JP2011/068849, mailed Nov. 22, 2011.

*Primary Examiner* — James Harvey
(74) *Attorney, Agent, or Firm* — Arent Fox LLP (57) ABSTRACT

Provided is a resistive element which is excellent in inrush current resistance even in the case of having a surface-mountable small chip shape. The resistive element has an element main body composed of a semiconductor ceramic in which a main constituent thereof is composed of a Mn compound represented by the general formula $(Nd_{1-x}M_x)_yBa_zMn_2O_6$ (M is at least one rare-earth element selected from Sm, Gd, Eu, Tb, Dy, Ho, Er, and Y), and x, y, and z respectively meet the conditions of: $0.05 \leq x \leq 0.4$; $0.80 \leq y \leq 1.2$; and $0.80 \leq z \leq 1.2$ in the chemical formula.

15 Claims, 5 Drawing Sheets

(56) References Cited

U.S. PATENT DOCUMENTS

2004/0159825 A1 8/2004 Chosokabe et al.
2012/0200969 A1 8/2012 Hirose
2013/0221475 A1* 8/2013 Hirose .......................... 257/467
2013/0229257 A1* 9/2013 Hirose ........................ 338/22 R

FOREIGN PATENT DOCUMENTS

WO   WO-2011052518 A1   5/2011

* cited by examiner

SEMICONDUCTOR CERAMIC AND RESISTIVE ELEMENT

This is a continuation of application Serial Number PCT/JP2011/240309, filed Aug. 22, 2011, the entire contents of which is incorporated herein by reference.

TECHNICAL FIELD

This invention relates to a semiconductor ceramic and a resistive element configured with the use of the semiconductor ceramic, and more particularly, relates to a resistive element advantageously for use as a thermistor element for suppressing an inrush current.

BACKGROUND ART

Resistive elements of interest to this invention include, for example, NTC thermistors. Patent Document 1 discloses, as a composition constituting a main body element for a NTC thermistor for use as a thermistor for temperature compensation or a thermistor for inrush current suppression (power thermistor), an oxide composition containing at least one of manganese, copper, calcium, cobalt, or nickel, with borosilicate glass added thereto.

Such thermistor materials which have a Mn—Co based spinel structure are widely used in conventional thermistors for temperature compensation or thermistors for inrush current suppression.

Figure 10:
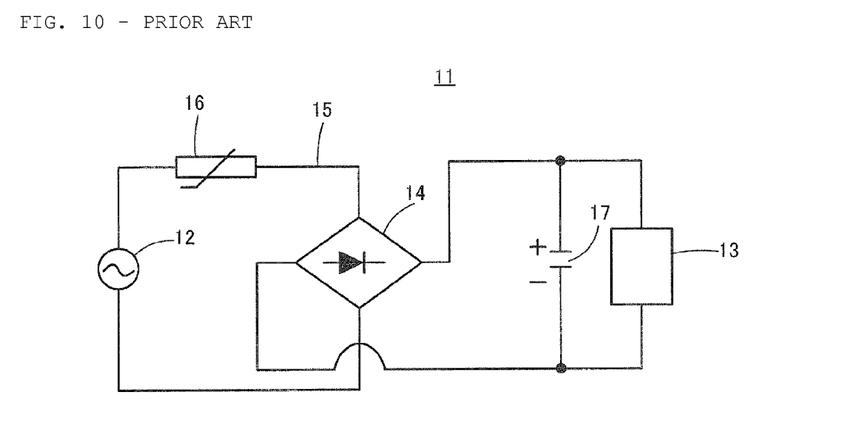
FIG. 10 is a block diagram of an electrical device 11 including a power thermistor 16 for inrush current suppression, which has been used conventionally.

In general, circuits as shown in FIG. 10 are used for inrush current suppression. FIG. 10 shows, as a block diagram, an electrical device including a power thermistor for inrush current suppression.

Referring to FIG. 10, an electrical device 11 includes a load circuit 13 driven by an alternating-current power supply 12, and the alternating-current power supply 12 is adapted to supply power through a rectifier 14 to the load circuit 13. A power thermistor 16 for inrush current suppression is connected in series with a power supply line 15 for this power supply. In addition, a smoothing capacitor 17 is connected in parallel to the load circuit 13.

Conventionally, an NTC thermistor is often used as the power thermistor 16. The NTC thermistor exhibits, unlike common solid resistors, a high resistance from power-off to immediately after power-on, and undergoes a decrease in resistance by self-heating after the power-on. Therefore, the NTC thermistor has an advantage of being able to reduce the power consumption, as compared with common solid resistors which undergo almost no change in resistance value depending on temperature changes.

To explain the operation of the circuit shown in FIG. 10 more specifically, (1) the inrush current generated by quickly charging the smoothing capacitor 17 in the case of applying power from the alternating-current power supply 12 is suppressed by the initial resistance R25 (resistance value at 25° C.) of the power thermistor 16 composed of the NTC thermistor; (2) after a steady current flows through the load circuit 13, the power thermistor 16 undergoes a decrease in resistance value as a result of self-heating; and (3) the reduced resistance of the power thermistor 16 can reduce the power loss when the steady current flows, as compared with solid resistors, and as a result, the power consumption can be restrained.

Therefore, the increased difference between the standby (power-off) resistance value at room temperature and the resistance value obtained when the steady current flows (B constant increased) with power thermistor 16 achieves a more beneficial inrush current suppression effect, and makes it possible to further restrain the power consumption in the steady state.

The power thermistor is widely used in power supply devices such as AC adapters. In the case of these applications, a single plate with a lead terminal, which is large in volume, is typically used as the power thermistor in order to withstand the high energy of the inrush current. However, the single-plate power thermistor with the lead terminal does not always serve the need to reduce the circuit in thickness and size, and has disadvantages in terms of mounting cost, etc. Therefore, power thermistors as SMDs (surface-mounted components) have been strongly desired.

However, when such an existing spinel thermistor material as described in Patent Document 1 is used for the power thermistor as an SMD-adaptive small-size chip device, there is a problem of element destruction caused by an inrush current encountered, thereby resulting in a failure to function as an inrush current countermeasure element, and no SMD-adaptive small-size power thermistor has been achieved yet. More specifically, this means that it is not possible to withstand the inrush current unless the element is large in volume in the case of existing materials.

There are several conceivable reasons therefor.

One of the reasons is that existing spinel thermistor materials have relatively high resistivity, and achieve only values on the order of 4000 at most for B constant. In general, insulators and semiconductors exhibit NTC (negative temperature coefficient) characteristics of resistance changed with the increase in temperature, and have a tendency to undergo a substantial change in resistance with respect to temperature as the resistivity is increased, and undergo a decrease in temperature dependence because as the resistivity is decreased, insulators are close to metals in response. More specifically, the B constant is increased as the resistivity is increased, whereas the B constant is decreased as the resistivity is decreased. Ideally, materials are suitable which is lower in resistivity and higher in B constant, while it is difficult to achieve a balance therebetween in the case of existing materials.

Therefore, measures have been taken for existing power thermistors, such as the interelectrode distance and the opposed electrode area respectively shortened and increased in order to lower the resistance as a device, while a thermistor material is selected which is dominated by hopping conduction, slightly high in resistivity, and approximately 3000 in B constant. As a result, conventional power thermistors serve as, for example, large disk-shaped devices.

However, when the inrush current flows in, it is absorbed by decreasing the element resistance while gradually converting the energy into heat, and it is not possible to substantially decrease the resistance, because of the B constant on the order of 3000. As a result, when the element is reduced in volume, element destruction is caused by the thermal energy or by the large inrush current.

In order to achieve SMD-adaptive small-size power thermistors, a novel material is required which can, at the very least, satisfy two conditions of relatively low resistivity and high B constant, and it is difficult to achieve a balance.

PRIOR ART DOCUMENTS

Patent Documents

Patent Document 1: Japanese Patent Application Laid-Open No. 2001-102204

DISCLOSURE OF THE INVENTION

Problem to be Solved by the Invention

An object of this invention is to provide a semiconductor ceramic as a thermistor material which can provide excellent resistance to inrush current even in the case of an SMD-adaptive small-size resistive element, and a resistive element configured with the use of the semiconductor ceramic.

Means for Solving the Problem

This invention is first directed to a semiconductor ceramic which is characterized in that a main constituent thereof comprises a Mn compound represented by the general formula $(Nd_{1-x}M_x)_yBa_zMn_2O_6$ (M is at least one rare-earth element selected from Sm, Gd, Eu, Tb, Dy, Ho, Er, and Y), and x, y, and z respectively meet the conditions of: $0.05 \leq x \leq 0.4$; $0.80 \leq y \leq 1.2$; and $0.80 \leq z \leq 1.2$ in the chemical formula.

This invention is also directed to a resistive element including: an element main body; and at least a pair of electrodes formed with at least a portion of the element main body interposed between the electrodes. The resistive element according to this invention is characterized in that the element main body comprises the semiconductor ceramic according to this invention.

The resistive element according to this invention is preferably used as a thermistor element for suppressing an inrush current.

In the resistive element according to this invention, the element main body preferably has a chip shape. In this case, the electrodes may be formed on respective end surfaces of the element main body so as to be opposed to each other, or may be formed in the element main body.

Advantageous Effect of the Invention

The semiconductor ceramic according to this invention can meet the two conditions of: relatively low resistivity and high B constant. Therefore, the use of this semiconductor ceramic can achieve SMD-adaptive resistive elements which are small in volume. In addition, even when the element main body is reduced in volume, an overwhelming high resistance to inrush current can be achieved as compared with resistive elements using existing thermistor materials.

This is assumed to be due to the following reason.

The semiconductor ceramic according to this invention has the main constituent composed of the Mn compound represented by the chemical formula $(Nd_{1-x}M_x)_yBa_zMn_2O_6$. This type of Mn compound exhibits, as known conventionally, CTR (Critical Temperature Resistance) characteristics which undergo a sudden change in resistance at a specific temperature, that is, has a high B constant.

In addition, the composition range defined in this invention can achieve a favorable balance between the heat generation and heat release of the element in the case of applying an inrush current, without decreasing the CTR characteristics, and inhibit element destruction while suppressing the inrush current.

Thus, the use of the semiconductor ceramic according to this invention makes it possible to exhibit high resistivity regarded as a charge ordering insulator and function as an inrush current suppression element in a steady state (near room temperature), and when an inrush current is applied to cause the element generate heat, change from a charge ordering insulator to a metal state and undergo a sudden decrease in resistivity to apply a large inrush current, and even a small-size resistive element including an element main body of, for example, 20 mm³ or less in volume, which absorbs inrush current, can achieve high inrush current resistance and inrush current suppression effect.

BEST MODE FOR CARRYING OUT THE INVENTION

A resistive element 1 according to a first embodiment of this invention will be described with reference to FIG. 1.

The resistive element 1 includes a chip-type element main body 2 composed of a semiconductor ceramic, and a pair of electrodes 3 and 4 formed on mutually opposed end surfaces of the element main body 2 so as to be opposed to each other.

Figure 2:
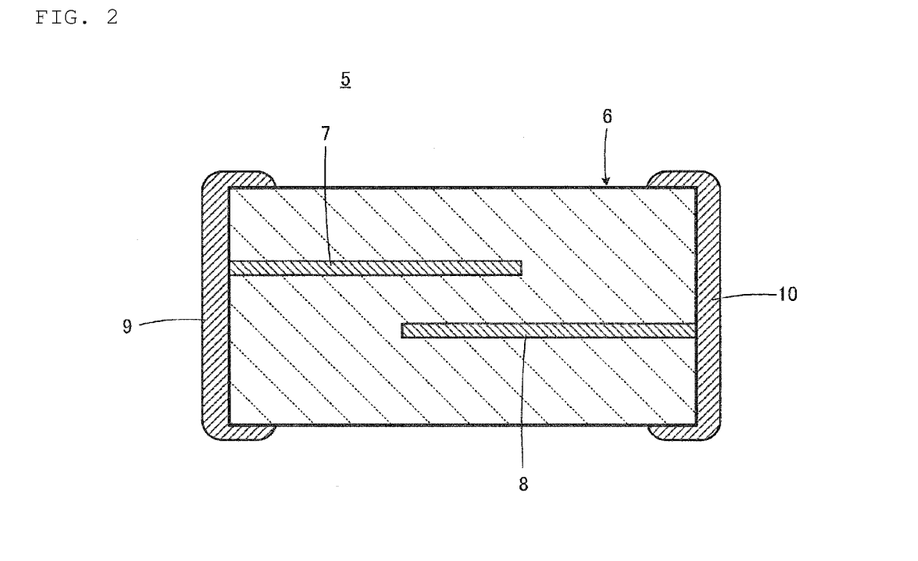
FIG. 2 is a cross-sectional view illustrating a resistive element 5 according to a second embodiment of this invention.

In a second embodiment shown in FIG. 2, the resistive element 5 includes: a chip-type element main body 6 composed of a semiconductor ceramic; a pair of internal electrodes 7 and 8 formed in the element main body 6 so as to be opposed to each other; and a pair of external electrodes 9 and 10 formed on mutually opposed end surfaces of the element main body 6 respectively so as to be electrically connected to the internal electrodes 7 and 8.

These resistive elements 1 and 5 are surface-mounted on wiring substrates, not shown, and advantageously used as thermistor elements for suppressing an inrush current, that is, as power thermistors. Preferably, the element main bodies 2 and 6 are 20 mm³ or less in volume.

Figure 1:
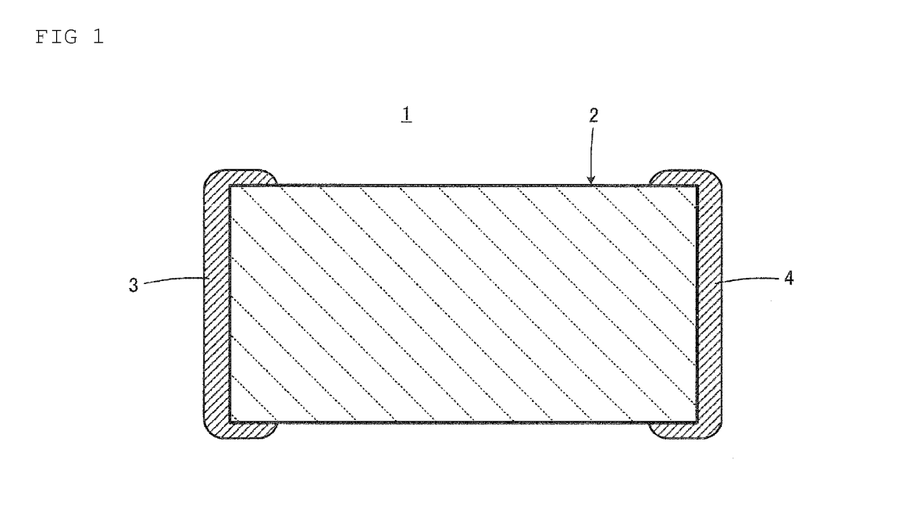
FIG. 1 is a cross-sectional view illustrating a resistive element 1 according to a first embodiment of this invention.

It is to be noted that the structure shown in FIG. 2 is typically employed to lower the element resistance when the element resistance is excessively higher than a desired value in the structure shown in FIG. 1.

The semiconductor ceramic constituting the element main body 2 or 6 in the resistive element 1 or 5 has a main constituent composed of a Mn compound represented by the chemical formula $(Nd_{1-x}M_x)_yBa_zMn_2O_6$ (M is at least one rare-earth element selected from Sm, Gd, Eu, Tb, Dy, Ho, Er, and Y). Further, in the chemical formula, x, y, and z are selected respectively so as to meet the conditions of: $0.05 \leq x \leq 0.4$; $0.80 \leq y \leq 1.2$; and $0.80 \leq z \leq 1.2$.

In order to manufacture the element main body 2 included in the resistive element 1 shown in FIG. 1, the following respective steps are carried out; preparation of starting raw materials; calcination; sheet forming; staking; degreasing; main firing; and reoxidation, and in the case of the element main body 6 including the resistive element 5 shown in FIG. 2, an internal electrode printing step is further carried out. In particular, the oxygen partial pressure in the main firing step is preferably controlled to $1 \times 10^{-6}$ MPa to $5 \times 10^{-12}$ MPa. The inventor has found that this control generates oxygen defects at relatively low temperatures in the main firing step, and as a result, can achieve the alignment of (Nd, M) with Ba at the A site efficiently in a relatively short period of time. In addition, it has been also found that the reoxidation treatment carried out subsequently also can take a shorter period of time.

Next, the electrodes 3 and 4 or the external electrodes 9 and 10 are formed by baking a conductive paste containing, for example, Ag as a conductive constituent onto predetermined surfaces of the element main body 2 or 6, thereby completing the resistive element 1 or 5.

This invention will be descried below more specifically with reference to Experimental Examples.

Experimental Example 1

As starting raw materials, high-purity (3 N or more) barium carbonate ($BaCO_3$) and manganese oxide ($Mn_3O_4$) were prepared, and further prepared were neodymium hydroxide (Nd$(OH)_3$) as a compound containing a rare-earth element Nd, as well as oxides of other rare-earth elements M: samarium oxide ($Sm_2O_3$); europium oxide ($Eu_2O_3$); gadolinium oxide ($Gd_2O_3$); terbium oxide ($Tb_4O_7$); dysprosium oxide ($Dy_2O_3$); holmium oxide ($Ho_2O_3$); erbium oxide ($Er_2O_3$); and yttrium oxide ($Y_2O_3$).

Next, these starting raw materials were weighed to have the compositions shown in Tables 1 to 8 after firing, and with the addition of pure water and a dispersant thereto, subjected to a grinding and mixing treatment for 24 hours with the use of PSZ balls of 2 mm in diameter.

Next, the slurry containing the starting raw materials, which was subjected to the grinding and mixing treatment, was dried, and subjected to granulation, and then calcination at a temperature of 800° C. for 2 hours in the atmosphere.

The calcined powder obtained was, with the addition of toluene, and EKINEN, and a dispersant thereto, then subjected to a grinding treatment for 24 hours with the use of PSZ balls of 5 mm in diameter, and, with the addition of a plasticizer and a binder thereto, further subjected to a mixing treatment for 12 hours to prepare a slurry for sheet forming.

A doctor blade method was applied to the slurry to prepare green sheets of 25 μm and 50 μm in thickness, and unfired element bodies were obtained through respective steps of stacking, pressure bonding, and cutting. It is to be noted that when the element resistance achieved through the steps described later was greater than 8Ω, green sheets with Pd internal electrodes printed thereon were stacked in the stacking step in order to obtain the structure shown in FIG. 2.

Next, the unfired element main bodies were subjected to a degreasing treatment at a temperature of 450° C. for 2 hours in the atmosphere, and then to main firing at a temperature of 1300° C. for 12 hours in a $H_2/H_2O/N_2$ atmosphere.

Then, a barrel treatment was carried out with the use of a PSZ powder of 0.5 mm in diameter, a polishing powder, and water, and a heat treatment for reoxidation was then carried out at a temperature of 600° C. for 24 hours in an oxygen atmosphere to obtain element main bodies.

Next, an Ag paste was applied onto both end surfaces of the element main bodies, and subjected to a baking treatment at a temperature of 800° C. in the atmosphere to form electrodes, thereby providing resistive elements for each sample. The resistive elements for each sample herein included two types of: size 3225 (3.2 mm×2.5 mm×2.5 mm) and size 2012 (2.0 mm×1.2 mm×1.2 mm). It is to be noted that while the element size slightly varies (on the order of ±0.5 mm) depending on the samples, because of the difference in ceramic shrinkage percentage, it has been confirmed that the variation has almost no influence on resistance to inrush current.

For the thus obtained resistive elements, the resistance temperature dependence was evaluated by a four-terminal method with the use of a resistance measuring device (Keithley 2430) and a temperature bath (from Despatch). The B constant as an indicator indicating how the resistance is changed with the change in temperature was calculated with the use of the following formula, from the resistance temperature dependence measured at every 10° C.

$$B\ Constant = \ln(R_1/R_2)/(1/T_1 - 1/T_2)$$

$R_1$ and $R_2$ are respectively resistance values [Ω] measured at temperatures [K] of $T_1$ and $T_2$.

Figure 3:
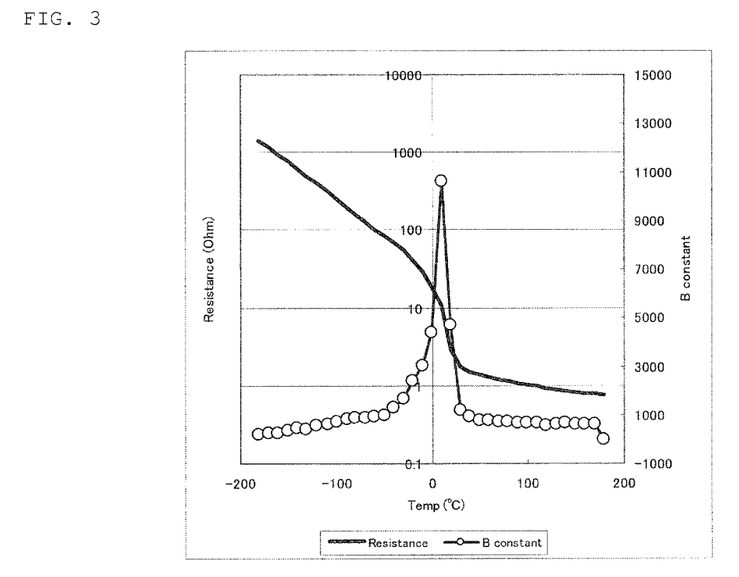
FIG. 3 is a diagram showing a resistance temperature dependence and a B constant for a semiconductor ceramic according to sample 1 obtained in Experimental Example 1.

For the samples obtained in this Experimental Example, FIG. 3 shows a resistance temperature dependence and B constant for sample 1. As shown in FIG. 3, the semiconductor ceramic containing the main constituent composed of the Mn compound which has a double perovskite structure of (Nd, M) aligned with Ba at the A site exhibits CTR characteristics suddenly decreased in resistance at a certain temperature. This is due to the fact that while the particular state of a charge ordering insulator has carriers frozen at not higher than the transition temperature, the charge ordering state is collapsed with the increase in temperature to allow the carriers to move around at once, thus exhibiting a rapid change in resistance.

Although not shown, it has been confirmed that the samples other than sample 1 also have substantially the same tendency as shown in FIG. 3. It is to be noted that sample 1 refers to a sample outside the scope of this invention.

In Tables 1 to 8, the term "Transition Temperature" indicates the temperature for the highest B constant.

Next, for each sample, the initial resistance was first measured at room temperature, and an inrush current resistance test was then carried out under the conditions of AC: 240 V, phase: 90°, and protective resistance: 1300Ω. In the inrush current resistance test, under the conditions mentioned above, an inrush current was applied to the sample five times for each load capacitance condition described below, the sample was left for 1 minute after the application, and the resistance was again measured to make a determination of "pass" in the case of a resistance within ±25% of the initial resistance, or make a determination of "fail" in the case of a resistance outside ±25% of the initial resistance. The load capacitance was gradually increased to 15 μF, 22 μF, 33 μF, 47 μF, 68 μF, 100 μF, 150 μF, and 220 μF, and the maximum load capacitance corresponding to the determination of "pass" was regarded as the maximum allowable load capacitance for an indicator of inrush current resistance. This maximum allowable load capacitance is shown in Tables 1 to 8.

In addition, the inrush current flowing through the sample was measured with an oscilloscope at the load capacitance of 150 μF, and the achieved degree of suppression effect against the current of 120 A flowing in the case of short circuit was calculated on the basis of the following formula:

Inrush Current Suppression Effect [%]=(Inrush Current Flowing Though Sample [A]/120[A])×100

The results are shown in Tables 1 to 8.

It is to be noted that the mark "-" put in the column "Inrush Current Suppression Effect (%)" means that the maximum allowable load capacitance was too low to measure the inrush current suppression effect in Tables 1 to 8.

In this invention, a determination of "pass" was made in the case of the maximum allowable load capacitance of 100 μF or more and the inrush current suppression effect of 20% or more, whereas a determination of "fail" was made in the other cases. It is to be noted that it has been confirmed that conventionally known Mn based spinel compounds have the maximum allowable load capacitance of 47 μF or less in the case of size 2012.

TABLE 1

| | Sample Number | Composition (x) $Nd_{1-x}Sm_xBaMn_2O_6$ | Transition Temperature (°C.) | Maximum Allowable Load Capacitance (μF) | | Inrush Current Suppression Effect (%) | |
|---|---|---|---|---|---|---|---|
| | | | | Size 3225 | Size 2012 | Size 3225 | Size 2012 |
| * | 1 | 0 | 10 | 220 | 220 | 8 | 5 |
| | 2 | 0.05 | 20 | 220 | 220 | 21 | 20 |
| | 3 | 0.1 | 30 | 220 | 150 | 31 | 33 |
| | 4 | 0.3 | 40 | 220 | 150 | 41 | 38 |
| | 5 | 0.4 | 50 | 150 | 100 | 40 | 38 |
| * | 6 | 0.5 | 60 | 68 | 33 | — | — |
| * | 7 | 0.8 | 70 | 33 | 15 | — | — |
| * | 8 | 1 | 80 | 33 | 22 | — | — |

TABLE 2

| | Sample Number | Composition (x) $Nd_{1-x}Eu_xBaMn_2O_6$ | Transition Temperature (°C.) | Maximum Allowable Load Capacitance (μF) | | Inrush Current Suppression Effect (%) | |
|---|---|---|---|---|---|---|---|
| | | | | Size 3225 | Size 2012 | Size 3225 | Size 2012 |
| | 9 | 0.05 | 20 | 220 | 220 | 20 | 22 |
| | 10 | 0.1 | 40 | 150 | 150 | 35 | 33 |
| | 11 | 0.3 | 50 | 150 | 100 | 40 | 42 |
| | 12 | 0.4 | 60 | 150 | 100 | 44 | 44 |
| * | 13 | 0.5 | 80 | 68 | 48 | — | — |
| * | 14 | 0.8 | 90 | 33 | 15 | — | — |
| * | 15 | 1 | 110 | 33 | 15 | — | — |

TABLE 3

| | Sample Number | Composition (x) $Nd_{1-x}Gd_xBaMn_2O_6$ | Transition Temperature (°C.) | Maximum Allowable Load Capacitance (μF) | | Inrush Current Suppression Effect (%) | |
|---|---|---|---|---|---|---|---|
| | | | | Size 3225 | Size 2012 | Size 3225 | Size 2012 |
| | 16 | 0.05 | 20 | 220 | 220 | 21 | 25 |
| | 17 | 0.1 | 40 | 150 | 150 | 35 | 40 |
| | 18 | 0.3 | 60 | 100 | 100 | 41 | 39 |
| | 19 | 0.4 | 70 | 100 | 100 | 38 | 45 |
| * | 20 | 0.5 | 80 | 33 | 15 | — | — |
| * | 21 | 0.8 | 90 | 33 | 33 | — | — |
| * | 22 | 1 | 120 | 33 | 15 | — | — |

TABLE 4

| Sample Number | Composition (x) $Nd_{1-x}Tb_xBaMn_2O_6$ | Transition Temperature (°C.) | Maximum Allowable Load Capacitance (μF) | | Inrush Current Suppression Effect (%) | |
|---|---|---|---|---|---|---|
| | | | Size 3225 | Size 2012 | Size 3225 | Size 2012 |
| 23 | 0.05 | 20 | 220 | 220 | 32 | 22 |
| 24 | 0.1 | 40 | 150 | 150 | 31 | 36 |
| 25 | 0.3 | 50 | 150 | 150 | 39 | 35 |
| 26 | 0.4 | 80 | 100 | 100 | 40 | 39 |
| *27 | 0.5 | 90 | 48 | 48 | — | — |
| *28 | 0.8 | 110 | 15 | 15 | — | — |
| *29 | 1 | 130 | 15 | 15 | — | — |

15

TABLE 5

| Sample Number | Composition (x) $Nd_{1-x}Dy_xBaMn_2O_6$ | Transition Temperature (°C.) | Maximum Allowable Load Capacitance (μF) | | Inrush Current Suppression Effect (%) | |
|---|---|---|---|---|---|---|
| | | | Size 3225 | Size 2012 | Size 3225 | Size 2012 |
| 30 | 0.05 | 30 | 220 | 220 | 35 | 30 |
| 31 | 0.1 | 40 | 150 | 150 | 39 | 41 |
| 32 | 0.3 | 60 | 150 | 100 | 41 | 41 |
| 33 | 0.4 | 90 | 150 | 100 | 40 | 42 |
| *34 | 0.5 | 140 | 48 | 33 | — | — |

TABLE 6

| Sample Number | Composition (x) $Nd_{1-x}Ho_xBaMn_2O_6$ | Transition Temperature (°C.) | Maximum Allowable Load Capacitance (μF) | | Inrush Current Suppression Effect (%) | |
|---|---|---|---|---|---|---|
| | | | Size 3225 | Size 2012 | Size 3225 | Size 2012 |
| 35 | 0.05 | 20 | 220 | 220 | 29 | 30 |
| 36 | 0.1 | 40 | 150 | 150 | 39 | 40 |
| 37 | 0.3 | 60 | 150 | 100 | 43 | 42 |
| 38 | 0.4 | 90 | 150 | 100 | 42 | 41 |
| *39 | 0.5 | 130 | 48 | 33 | — | — |

TABLE 7

| Sample Number | Composition (x) $Nd_{1-x}Er_xBaMn_2O_6$ | Transition Temperature (°C.) | Maximum Allowable Load Capacitance (μF) | | Inrush Current Suppression Effect (%) | |
|---|---|---|---|---|---|---|
| | | | Size 3225 | Size 2012 | Size 3225 | Size 2012 |
| 40 | 0.05 | 20 | 150 | 150 | 35 | 29 |
| 41 | 0.1 | 50 | 150 | 100 | 41 | 40 |
| 42 | 0.3 | 60 | 150 | 100 | 42 | 39 |
| 43 | 0.4 | 90 | 150 | 100 | 39 | 42 |
| *44 | 0.5 | 140 | 33 | 33 | — | — |

TABLE 8

| Sample Number | Composition (x) $Nd_{1-x}Y_xBaMn_2O_6$ | Transition Temperature (°C.) | Maximum Allowable Load Capacitance (μF) | | Inrush Current Suppression Effect (%) | |
|---|---|---|---|---|---|---|
| | | | Size 3225 | Size 2012 | Size 3225 | Size 2012 |
| 45 | 0.05 | 20 | 150 | 150 | 39 | 34 |
| 46 | 0.1 | 50 | 150 | 100 | 40 | 37 |
| 47 | 0.3 | 60 | 150 | 100 | 45 | 40 |
| 48 | 0.4 | 100 | 150 | 100 | 40 | 38 |
| * 49 | 0.5 | 140 | 48 | 33 | — | — |

In Tables 1 to 8, samples assigned with the designation * fall outside the scope of this invention.

The samples within the scope of this invention correspond to y=1 and z=1 in $(Nd_{1-x}M_x)_yBa_zMn_2O_6$, and meet the condition of $0.05 \leq x \leq 0.4$ with respect to x.

As is clear from Tables 1 to 8, the samples within the scope of this invention can achieve characteristics such as a maximum allowable load capacitance of 100 μF or more and an inrush current suppression effect of 20% or more in each case of size 3225 and size 2012.

Figure 4:
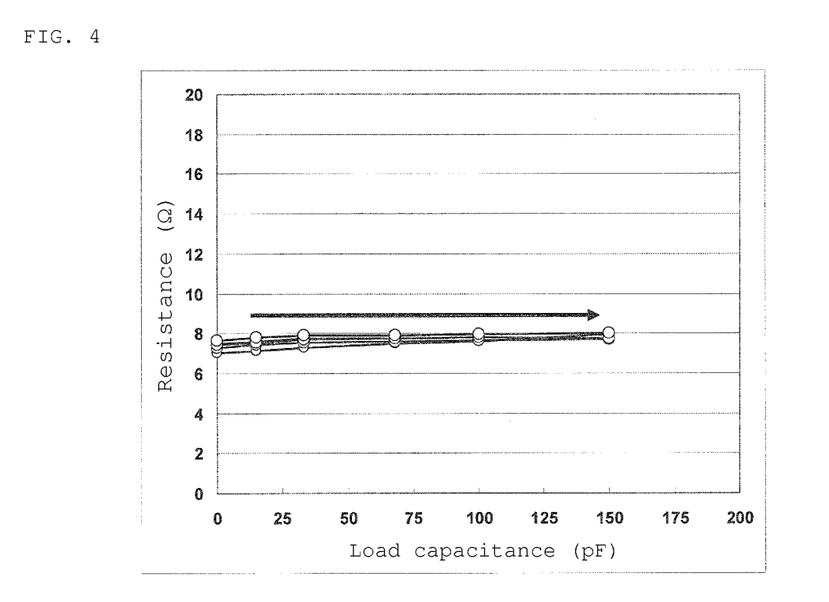
FIG. 4 is a diagram showing resistance to inrush current for a semiconductor ceramic according to sample 17 obtained in Experimental Example 1.
Figure 5:
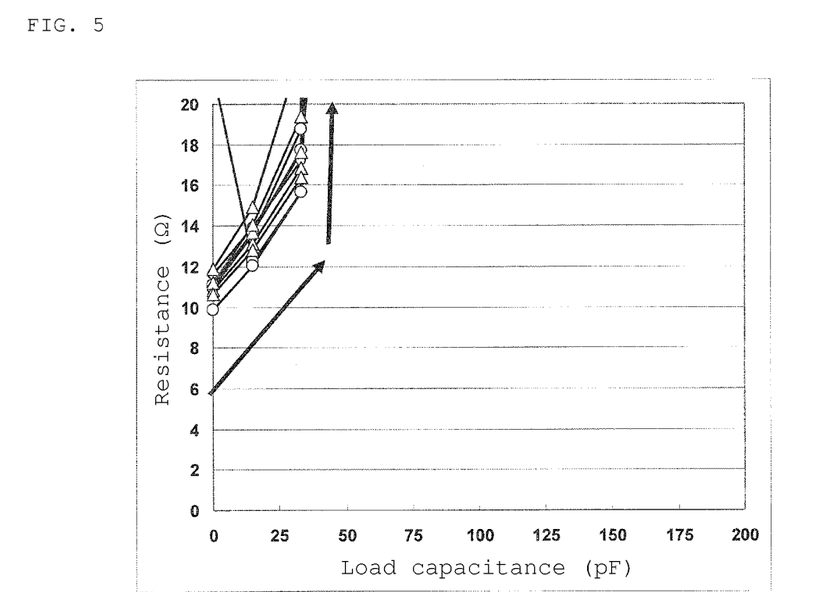
FIG. 5 is a diagram showing resistance to inrush current for a semiconductor ceramic according to sample 20 obtained in Experimental Example 1.

Representatively, FIGS. 4 and 5 respectively show the results of the inrush current test for size 2012 elements according to sample 17 within the scope of this invention and sample 20 outside the scope of this invention, respectively.

First, as can be seen from FIG. 4, sample 17 undergoes almost no change in resistance even when the load capacitance is increased to apply a large inrush current, thereby succeeding in achieving excellent resistance. On the other hand, as shown in FIG. 5, sample 20 undergoes a significant change in resistance even in the case of smaller load capacitance, thereby undergoing an extreme increase in resistance. This sample 20 have the same degree of resistance as those of conventionally known Mn based spinel compounds.

From the foregoing, it is determined that the application of this invention makes it possible to achieve the same degrees of inrush current resistance and suppression effect as those of conventional large single-plate thermistor elements with the use of a small chip capable of providing an SMD such as size 3225 or size 2012, thereby allowing electronic devices using the resistive element to be reduced in size and thickness.

Sample 1 shown in Table 1 refers to a sample with x=0 outside the scope of this invention. Sample 1 achieves the maximum allowable load capacitance of 220 μF, but has the very small inrush current suppression effect less than 10%. This is considered to be due to the low temperature at which the resistance is decreased steeply, that is, at a low transition temperature of 10° C., the resistance is decreased in the initial stage of applying the inrush current to cause the inrush current to pass by.

In addition, the samples with x>0.4 have succeeded in achieving only the same degree of resistance to inrush current as those of conventionally known Mn based spinel compounds, while the resistance value was adjusted to 8Ω. Although the cause is not clear, it is presumed that due to the high transition temperature at which the resistance is changed steeply, the inrush current is directly absorbed to cause element destruction by heat generation from the element. However, the inrush current resistance may vary even in the case of the same transition temperature, the inrush current resistance is not determined just by the transition temperature and the specific resistivity, and furthermore, the thermal conductivity are considered to be all combined with each other to affect the inrush current resistance.

From the foregoing, it is considered that, while this invention makes it possible for the small chip capable of providing an SMD to achieve the same degrees of inrush current resistance and suppression effect as those of large single-plate thermistor elements, the CTR characteristics associated with the material system of the semiconductor ceramic according to this invention mainly contribute to this achievement as described previously, and further improved characteristics are achieved by controlling the material system to appropriate composition, transition temperature, and resistance.

Experimental Example 2

In Experimental Example 2, samples with y and z varied in the chemical formula $(Nd_{1-x}M_x)_yBa_zMn_2O_6$ representing the composition of the main constituent in the semiconductor ceramic were prepared, and evaluated in the same way as in Experimental Example 1.

Table 9 shows M and the amount x thereof in the chemical formula for the samples prepared in Experimental Example 2. The x meets the condition of $0.05 \leq x \leq 0.4$ within the scope of this invention for all of the samples. In addition, the y and z in the chemical formula for the samples prepared in Experimental Example 2 are indicated by coordinates (y,z) at which "○" or "x" is located in FIG. 9.

TABLE 9

| M | Amount (x) |
|---|---|
| Sm | 0.05 |
| Sm | 0.1 |
| Sm | 0.3 |
| Sm | 0.4 |
| Eu | 0.05 |
| Eu | 0.1 |
| Eu | 0.3 |
| Eu | 0.4 |
| Gd | 0.05 |
| Gd | 0.1 |
| Gd | 0.3 |
| Gd | 0.4 |
| Tb | 0.05 |
| Tb | 0.1 |
| Tb | 0.3 |
| Tb | 0.4 |
| Dy | 0.05 |
| Dy | 0.1 |
| Dy | 0.3 |
| Dy | 0.4 |
| Ho | 0.05 |
| Ho | 0.1 |
| Ho | 0.3 |
| Ho | 0.4 |
| Er | 0.05 |
| Er | 0.1 |
| Er | 0.3 |
| Er | 0.4 |

TABLE 9-continued

| M | Amount (x) |
|---|---|
| Y | 0.05 |
| Y | 0.1 |
| Y | 0.3 |
| Y | 0.4 |

Also in Experimental Example 2 herein, as in the case of Experimental Example 1, a determination of pass was made in the case of the inrush current resistance of 100 μF or more and the inrush current suppression effect of 20% or more, whereas a determination of fail was made in the other cases for the samples of size 2012.

Figure 6:
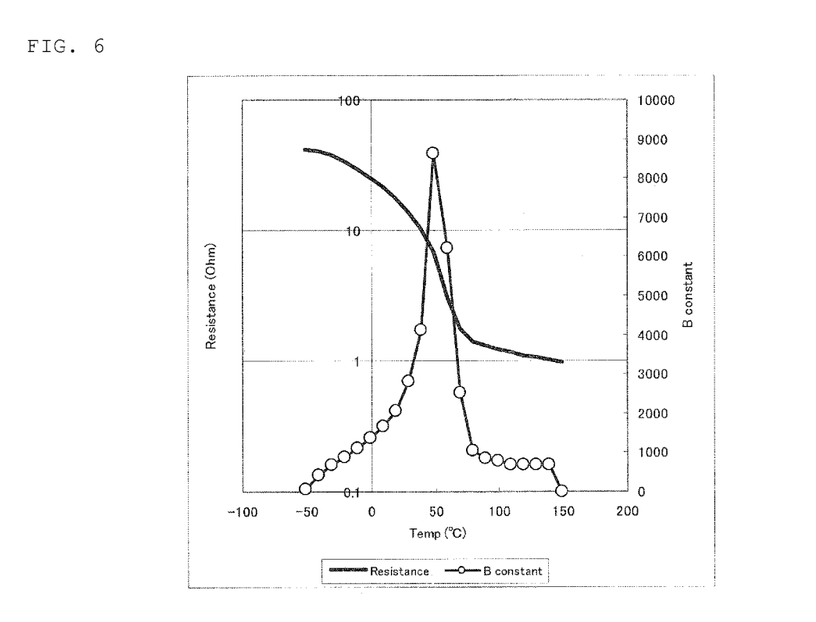
FIG. 6 is a diagram showing a resistance temperature dependence and the B constant for a semiconductor ceramic according to a sample of chemical formula $(Nd_{1-x}Gd_x)_yBa_zMn_2O_6$ with x=0.30 and y and z=0.75, which was obtained in Experimental Example 2.
Figure 7:
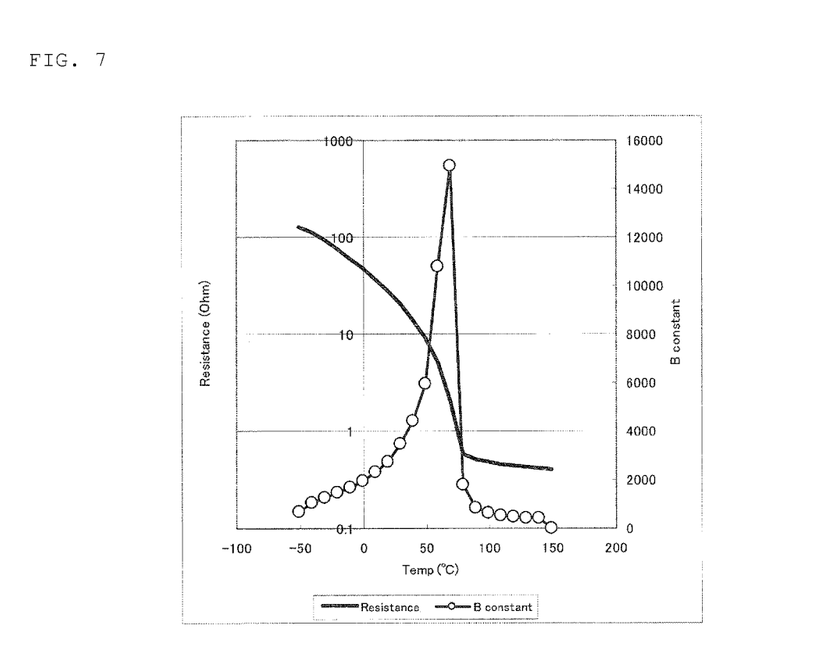
FIG. 7 is a diagram showing a resistance temperature dependence and a B constant for a semiconductor ceramic according to a sample of chemical formula $(Nd_{1-x}Gd_x)_yBa_zMn_2O_6$ with x=0.30 and y and z=1.00, which was obtained in Experimental Example 2.
Figure 8:
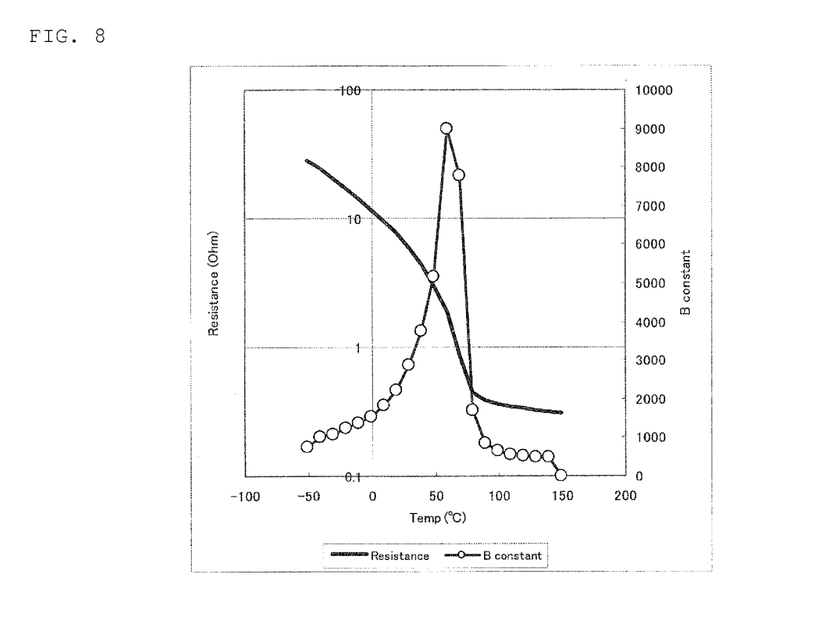
FIG. 8 is a diagram showing a resistance temperature dependence and the B constant for a semiconductor ceramic according to a sample of chemical formula $(Nd_{1-x}Gd_x)_yBa_zMn_2O_6$ with x=0.30 and y and z=1.25, which was obtained in Experimental Example 2.

FIGS. 6, 7, and 8 show resistance temperature dependence and B constant for three samples which represent the prepared samples. FIG. 6 shows resistance temperature dependence and B constant for the sample of M: Gd, x=0.30, y=0.75, and z=0.75; FIG. 7 shows resistance temperature dependence and B constant for the sample of M: Gd, x=0.30, y=1.00, and z=1.00; and FIG. 8 shows resistance temperature dependence and B constant for the sample of M: Gd, x=0.30, y=1.25, and z=1.25.

When FIGS. 6 to 8 are compared with each other, the sample of y=1.00 and z=1.00 shown in FIG. 7 exhibits the maximum B constant, and exhibits characteristics of resistance steeply changed with respect to temperature. On the other hand, even in the case of y, z=0.75 or y, z=1.25 deviating from the conditions of 0.80≤y≤1.2 and 0.80≤z≤1.2 which define the scope of this invention, as in the sample shown in FIG. 6 or the sample shown in FIG. 8, the B constant reaches 9000, thereby achieving twice or more times as high as the B constants of common Mn based spinel NTC thermistor materials.

Figure 9:
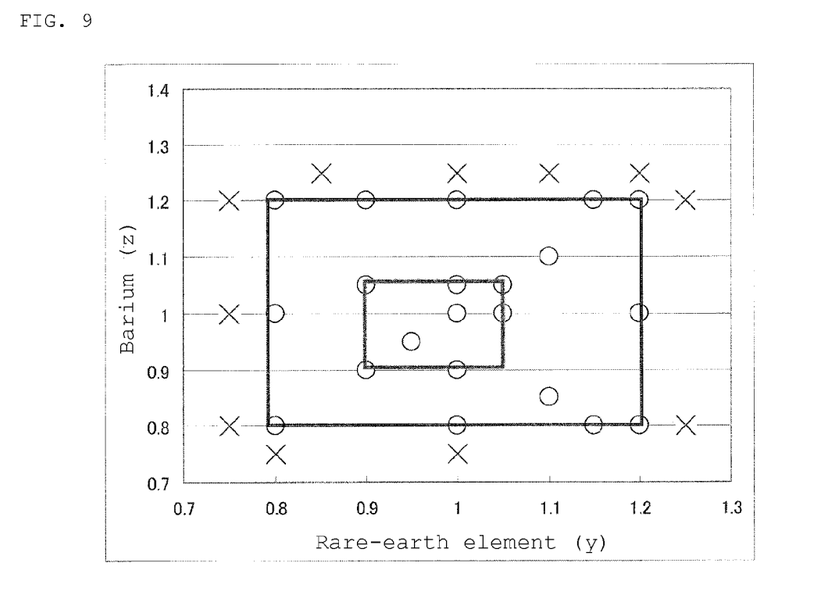
FIG. 9 is a diagram for explaining the relationship between the ranges of y and z in the chemical formula $(Nd_{1-x}M_x)_yBa_zMn_2O_6$ and inrush current resistance and suppression effect, for samples obtained in Experimental Example 2.

However, the ranges of y and z which can achieve inrush current resistance of 100 μF or more and inrush current suppression effect of 20% or more were checked to provide results as shown in FIG. 9. In FIG. 9, the mark "○" represents samples which meet the conditions of inrush current resistance: 100 μF or more and inrush current suppression effect: 20% or more, and the mark "x" represents samples which fail to meet to the conditions.

As shown in FIG. 9, the samples in the composition range which meets the conditions of 0.80≤y≤1.2 and 0.80≤z≤1.2 have succeeded in achieving an inrush current resistance of 100 μF or more and an inrush current suppression effect of 20% or more. The other samples undergo an extreme decrease in inrush current resistance, even while the samples represent large values for B constant.

As can be seen from Experimental Example 2, high inrush current resistance and inrush current suppression effect can be achieved under the conditions of 0.80≤y≤1.2 and 0.80≤z≤1.2 within the scope of this invention, regardless of the type and amount x of the rare-earth element M. Although the reason has not been defined yet, it is considered that there is a possibility of decreasing the resistance by the segregation of more heterophase in accordance with the deviation of y or z from 1, or by electric current concentrated locally due to the alignment at the A site. This is also strongly reflected by the fact that the inrush current resistance is not affected very much by the change in transition temperature and the change in B constant as shown in FIGS. 6 to 8, due to the change in the type and amount x of the rare-earth element M.

DESCRIPTION OF REFERENCE SYMBOLS

1, 5 resistive element
2, 6 element main body
3, 4 electrode
7, 8 internal electrode
9, 10 external electrode

The invention claimed is:

1. A semiconductor ceramic having a main constituent which comprises a Mn compound represented by a general formula $(Nd_{1-x}M_x)_y Ba_z Mn_2 O_6$ in which M is at least one rare-earth element selected from the group consisting of Sm, Gd, Eu, Tb, Dy, Ho, Er, and Y, $0.05 \leq x \leq 0.4$; $0.80 \leq y \leq 1.2$; and $0.80 \leq z \leq 1.2$.

2. The semiconductor ceramic according to claim 1 wherein $0.1 \leq x \leq 0.3$.

3. The semiconductor ceramic according to claim 2 wherein y and z are ≤1.0.

4. A resistive element comprising:
an element main body, and a pair of electrodes having at least a portion of the element main body interposed therebetween,
wherein the element main body comprises the semiconductor ceramic according to claim 1.

5. A thermistor element for suppressing an inrush current comprising the resistive element according to claim 4.

6. The resistive element according to claim 5, wherein the element main body has a chip shape, and the electrodes are on respective end surfaces of the element main body so as to be opposed to each other.

7. The resistive element according to claim 6, wherein the element main body has a volume of 20 mm³ or less.

8. The resistive element according to claim 4, wherein the element main body has a chip shape, and the electrodes are on respective end surfaces of the element main body so as to be opposed to each other.

9. The resistive element according to claim 8, wherein the element main body has a volume of 20 mm³ or less.

10. The resistive element according to claim 5, wherein the element main body forms a chip shape, and the electrodes are disposed in the element main body so as to be opposed to each other.

11. The resistive element according to claim 10, wherein the element main body has a volume of 20 mm³ or less.

12. The resistive element according to claim 4, wherein the element main body forms a chip shape, and the electrodes are disposed in the element main body so as to be opposed to each other.

13. The resistive element according to claim 12, wherein the element main body has a volume of 20 mm³ or less.

14. The resistive element according to claim 5, wherein the element main body has a volume of 20 mm³ or less.

15. The resistive element according to claim 4, wherein the element main body has a volume of 20 mm³ or less.

* * * * *